Oct. 4, 1966  H. S. BEATTIE ETAL  3,276,690
DESERIALIZER AND TRANSDUCER THEREFOR
Filed Jan. 5, 1965  2 Sheets-Sheet 1

INVENTOR.
HORACE S. BEATTIE
WILLIAM F. VOIT, JR.

BY  E. Ronald Coffman
ATTORNEY.

Oct. 4, 1966    H. S. BEATTIE ETAL    3,276,690
DESERIALIZER AND TRANSDUCER THEREFOR
Filed Jan. 5, 1965    2 Sheets-Sheet 2

United States Patent Office 3,276,690
Patented Oct. 4, 1966

3,276,690
DESERIALIZER AND TRANSDUCER THEREFOR
Horace S. Beattie and William F. Voit, Jr., Lexington, Ky., assignors to International Business Machines Corporation, Armonk, N.Y., a corporation of New York
Filed Jan. 5, 1965, Ser. No. 423,529
16 Claims. (Cl. 235—201)

In distant communication systems it is a common practice to encode information in multiple channel binary bits grouped to represent, by permutation, a piece of more complex information such as a number or letter. The bits within channels are transmitted serially and each serial group identified by additional start and stop bits for detection purposes. To receive information so transmitted it is necessary to detect accurately each of the pulses or absence of bits until all have been received, and results in parallel to suitable translating mechanism. This operation is known as deserialization or code conversion. In current practice deserialization is accomplished by electronic means employing electrical or electro-mechanical storage and logic elements capable of detecting a group or byte arriving serially, storing the bits or absence of bits until all have been received, and transmitting the stored information simultaneously to a permutation translator. The principal drawback to electronic deserialization is the component cost.

Other forms of deserialization including mechanical deserialization methods have been proposed, however, problems due to timing have not been adequately overcome. The pulses within a transmitted signal have some distinct time length of existence, but this length may vary with standard tolerance limits. Thus, although a code pulse may have a duration of, for example, seven milliseconds, it is desired to provide a sampling time, 1 millisecond and mechanism capable of responding thereto.

Accordingly it has been an object of this invention to devise and develop relatively low cost but accurate signal deserialization apparatus.

Another object of this invention has been to devise and develop deserialization apparatus that is capable of producing a mechanical output for use in mechanical permutation translating mechanism.

A further object of this invention has been to devise a pneumatic-mechanical transducer for detecting the directional state of a pure fluid amplifier and producing a mechanical output responsive thereto.

These and other objects of this invention will become more apparent and be more fully understood from a reading and understanding of the following description of the basic concepts on which this invention is based.

One phase of this invention relates to the provision of an annular series of bi-stable pure fluid latches corresponding to the number of bits or channels in the code to be deserialized. A pneumatic commutator driven in synchronism with the succession speed of received signals delivers a pneumatic representation of such received signals to a control port of the fluid latches to thereby change or not change their directional state depending upon the nature of the received bit. After all fluid latches have received information from their corresponding code channels, status sensing means associated with each of the fluid latches functions to provide parallel output signals therefrom simultaneously to represent by permutation an information byte such as a letter or number. The mechanism is reset by fluid input signals that return the fluid latches to a known predetermined state.

The initiation of the commutator action is controlled by a standard start bit which conveniently is employed to control a clutch connection between the commutator and a constantly rotating member.

Another phase of this invention relates to the provision of a lightweight, freely floating, centrally pivoted mechanical vane for indicating the directional status of the pure fluid amplifier or latch by its angular orientation about its axis. The angular orientation is detected by a probe that is constructed to be engageable with the vane in one status indicating position thereof and not in engagement during its other flow status. The contact or no contact operation of the probe, being a pure mechanical phenomena is easily converted into a mechanical motion or force output which can be employed to manipulate translating mechanism, or produce any other mechanical, electrical, or fluid outputs desired.

Another phase of this invention relates to the use of an electromagnetically positioned spool valve for producing pneumatic representation of a serially received signal. Accurate decoding of a signal requires positive rapid and reproducible transduction of an electrical impulse into a pneumatic impulse. Electromagnetic mechanical transducers of the moving coil type are capable of responding quickly to electrical impulses to produce a given throw of an armature member. A spool valve has the inherent capability of producing positive "on"-"off" action given a predetermined valve displacement, without regard for pressure effect due to flow therethrough. Furthermore the absence of pressure-effect-influence on a spool valve permits lightweight valve construction that minimizes inertial effects tending to distort the received signal in transduction.

The following description of a specific illustrative embodiment of our invention will bring out more clearly the foregoing concept especially with reference to the accompanying drawings of which FIGURE 1 is a perspective view of a deserializer constructed in accordance with this invention partially broken away to reveal internal details thereof;

Figure 1:
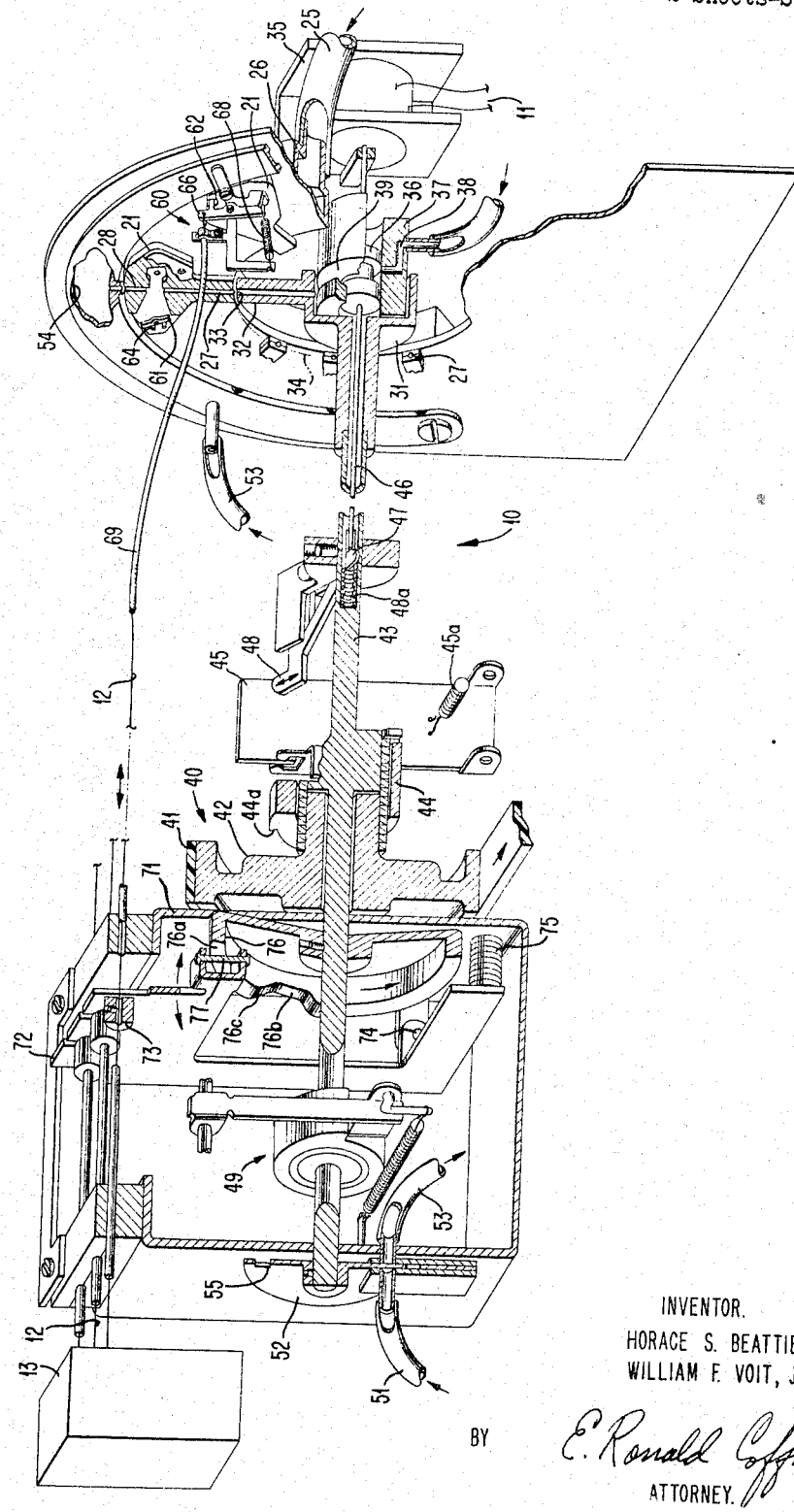

Referring now more specifically to the drawings in FIGURE 1, there is shown a pneumatic information bit deserializer or code signal converter 10 that receives serial coded input signals from a communicating or transmission line as illustrated generally at 11 and delivers the signals in parallel form through a mechanical output means represented by plural shielded cable wires 12 that may be operatively connected to any parallel signal utilization device 13 such as a paper tape punch, typewriter, etc. The signals received from the transmission line 11 are in the form of timewise space channels, code bits or pulses each having one of two possible value levels. The bits taken in groups, are permutably decipherable as more complex information such as a number or an alphabetic letter. The groups each contain a start bit which indicates that the remaining bits will follow in a preset time sequence. Thus the particular value level (usually the presence or absence of a pulse) within a channel is readily determinable by a time controlled sampling technique, synchronized with the preset time sequence.

Figure 4:
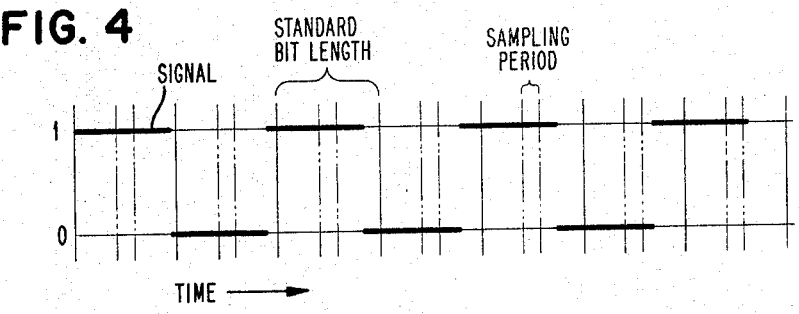
FIGURE 4 is a graphical representation of typical signal timing distortions having standard and sample timing superimposed thereon.

The preset time sequence may vary somewhat within a tolerance range requiring a degree tolerance flexibility in the sampling technique. It is thus desirable that signal sampling be confined to a small limited time segment of the bit and that the sampling time be located at the expected center of the bit. FIGURE 4 shows a graphic example of a typical timing distortion. Superimposed on the pulses are typical desirable sampling segments which provide a reliable positive indication of the presence or absence of a pulse at any particular time spot. It is apparent from FIGURE 4 that nonstandard timing of bits creates a cumulative error that is most noticeable at the final pulse in a sequence. It is just as apparent from FIGURE 4 that apparatus having short sampling time capabilities permits the adverse effects of in-tolerance timing error to be eliminated.

Figure 2:
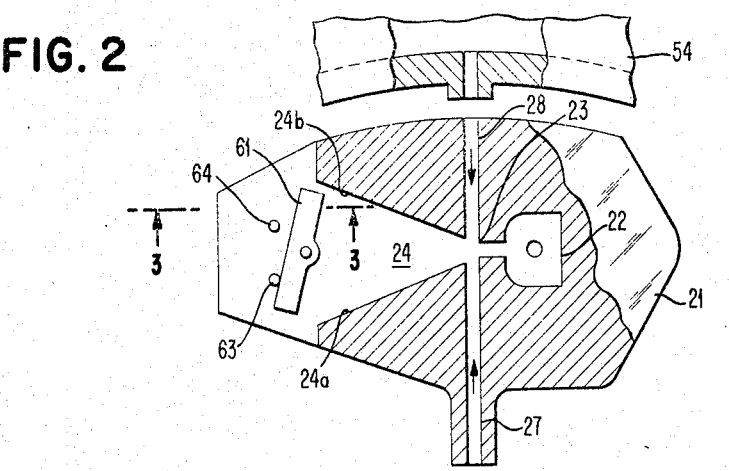
FIGURE 2 is an enlarged cross sectional view of a pure fluid amplifier or latch employed in the deserializer shown in FIGURE 1.

The critical sampling technique of this invention is performed by an annular array of series of bistable pure fluid amplifier devices 21 more properly referred to as bistable pure fluid latches which perform as bistable, fluid actuated, pressure fluid controlling latches having a capability of status change upon receipt of a signal of a duration as low as 1 millisecond. The status of the fluid latches is determined by whether a jet issuing from a plenum 22 through a restricted inlet or throat portion 23, is attached to a first wall 24a of a diverging channel outlet portion 24, or to a second wall 24b. The plenums 22 of the fluid latches 21 receive supply fluid constantly from a source (not shown) through a conduit 25 and part annular manifold 26. The jet is shiftable from one wall to the other by application of a pressure differential or disturbance usually created by receipt of a fluid signal through one or the other of transversely directed input signal and reset passage means or control portions 27 and 28 respectively in accordance with well known principles. For example, as best seen in FIGURE 2, the jet is attached to the wall 24a as in a reset or no pulse condition or status. A fluid signal applied to conduit 27 for at least 1 millisecond will shift or switch the jet from the wall 24a to the wall 24b and the jet will remain attached to the wall 24b until reset by a fluid signal supplied to the conduit 28.

One fluid latch 21 is provided for each of the channels or levels of the particular serialized code to be received. The latches 21 are equiangularly spaced for the usual situation where the pulses arrive at constant time intervals. A rotor 31 operatively carrying a radially-outwardly extending fluid conduit provides a commutator or supply nozzle 32 having an outlet portion or information transmittal means 33.

The rotor 31 is mounted for rotation about an axis A—A whereby the conduit outlet portion 33 traverses an arcuate path 34 on which substantially lie the input signal passage means 27 of the annular array of fluid latches 21 so as to be sequentially positionable in fluid communication or cooperation therewith.

The signal received at the transmission line 11 is converted into a fluid signal by a suitable electrical-mechanical transducer or serial input means 35 such as a solenoid or moving coil actuator which displaces means preferably including a spool valve 36 axially within a valve sleeve 37 for providing selective communication between a fluid pressure source (not shown) and the signal input passage means 27 of a cooperating fluid latch 21 to create a status changing pressure differential across the fluid latch through an inlet or first flow portion or supply conduit 38 connected to the source of fluid pressure or other fluid flow potential and into a second flow portion comprising a manifold chamber or segment shaped slot-like passageway 39 which is in constant communication with the commutator fluid conduit 32. The spool valve 36 is uninfluenced by the pressure or flow therethrough and provides a positive full-on, full-off valving action simply by providing sufficient throw or displacement to completely uncover the manifold chamber 39. The manifold chamber 39 permits fluid from the spool valve 36 to take the most direct route to the commutator 32 regardless of its angular position and thereby eliminate any signal phase distortion that might be induced by a varying fluid flow path length. It will thus be seen that at the time of coincidence between a signal received from transmission lines 11 and cooperative alignment of the conduit outlet portions 33 with a signal input passage means 27 of a fluid latch 21, that fluid latch will be shifted from its reset status to its pulse indicating status, i.e. the jet will be shifted from wall 24a to wall 24b.

To properly determine the presence or absence of a pulse in any given channel, the commutator 32 is rotated past the fluid latches 21 at a rate that is in synchronism with the signal pulse timing. Means for driving the rotor 31 about its axis A—A is shown generally at 40. The driving means 40 comprises a constantly rotating timing and power input mechanism including a motor (not shown) that drives a belt 41 and a constantly rotating pulley member 42. The pulley member 42 is connected to a main shaft 43 and commutator 32 through single revolution clutch means 44, which for purposes of illustration is shown as a spring clutch having an engagement controlling or activating latch 45 that is biased by a spring 45a to a latching or shaft nonengaging position. Clutches of this type are well known in the art. The clutch 44 thus normally disconnects the pulley 42 from the shaft 43 and rotor 31. When engaged, the clutch 44 will connect the pulley 42 to the shaft 43 causing the commutator 32 to sweep past the signal input passage means 27 of the fluid latches 21 in substantial synchronism with the timed relation between the several code channels within a group.

In addition to a synchronous rate of movement, it is necessary that the commutator movement start at the proper time with respect to the received code group. As mentioned above, each signal group is preceded by a start bit or pulse. In this invention, the start pulse is converted, just as the code bits by the electromechanical transducer 35 into a mechanical motion of the valve 36. The valve 36 has a push rod or link 46 that engages a trigger arm 47 of a clutch picking lever or bellcrank 48. The trigger 47 is biased by a spring 48a into constant contact with the rod 46. The clutch picking lever 48 and its supporting structure rotate with the shaft 43 and are located in the clutch disengaged position such that the lever 48 is cooperatively opposed to the clutch latch 45. Accordingly, upon the receipt of a start pulse from the transmission line 11, the transducer 35 will move the rod 46 to rotate the lever 48 against the clutch latch 45, unlatch the clutch 44 to couple the pulley 42 to the shaft 43, and initiate the rotative sweep of the commutator 32 past the signal input passage means 27 of the fluid latches 21. At the end of a complete revolution, the clutch latch 45, being spring biased against latch face 44a of the clutch 44 will thus relatch the clutch, break or stop the motion of shaft 43, and disengage the driving connection between the pulley 42 and the shaft 43. A shaft positioning latch and cam generally indicated at 49 is provided in accordance with known principles to prevent backward motion of the shaft 43.

The fluid latches 21 are reset to a common status at the end of each cycle by simultaneous application of a reset fluid pulse to their respective reset control passage means 28. The reset fluid pulse is derived from means including a source (not shown) through conduit 51, reset control valve 52, tubing 53 and a part annular manifold 54 that projects the reset pulse into the reset passage means 28. The reset control valve 52 comprises a disk mounted on the shaft 43 for rotation thereby and containing a valve port 55 that is positioned between the conduits 51 and 53 when the shaft 43 is in its stationary or non-driven position, to thereby provide fluid communication between the conduits 51 and 53 at the end of each cycle.

The operation of the mechanism thus far described is as follows: Upon receipt of a start bit from the transmission line 11, the transducer 35 will cause the valve 36 and rod 46 to move to the left, pivoting the lever 48 against the clutch latch 45, unlatching the clutch and completing the drive connection between the pulley 42 and the shaft 43. The shaft 43 will rotate at a predetermined speed causing the commutator 32 to sweep past the signal input passage means 27 of each of the fluid latches 21 at a time corresponding to the time at which a signal pulse, if any, is to be received. If a signal pulse is received at the time the commutator 32 is passing a fluid latch 21, the status of that latch will be changed from the normal status as shown in FIGURE 2 wherein the jet is attached to the wall 24a, to the abnormal or opposite status wherein the jet is attached to the wall 24b. After the commutator 32 has passed the last fluid latch 21 in the series, each of the fluid latches 21 will be in a status indicating the presence or absence of a pulse in their respective channel of the received pulse group. At this time it is possible to simultaneously detect the status of each fluid latch 21 and thereby attain a parallel permutated signal for use wherever desired. Continuing the cycle, the shaft 43 will complete its 360 degrees of rotation whereupon the clutch latch 45 will halt the shaft 43, and the reset valve 52 will supply a reset fluid pulse to the manifold 54 and each of the fluid latches 21 returning them to a common normal status.

The means for detecting the instantaneous status of the fluid latches 21 is provided by a pneumatic-mechanical transducer 60 which comprises generally a balanced latch status indicative vane or interposer 61 pivoted about a central axis B—B, and a probe or feeler 62 that is capable of determining the presence or absence of the vane 61 by force engagement thereof in one of its two position. Preferably the force engagement is directed non-tangentially of the axis B—B. The vane 61 is positioned by the jet against one of two pivotal movement limiting or locating pins 63 or 64 depending upon whether the jet is attached to the wall 24a or the wall 24b.

In FIGURE 2 the vane 61 is shown in its normal or reset indicating position wherein it is pivoted by the jet against the pin 63.

Figure 3:
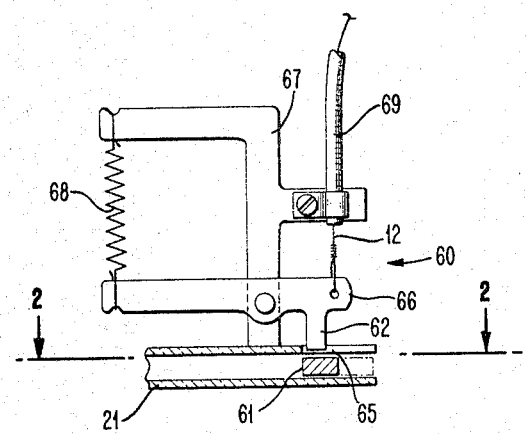
FIGURE 3 is an enlarged elevational cross sectional view of a pneumatic-mechanical transducer employed in the deserializer shown in FIGURE 1 for detecting the status of the fluid latches therein.

In FIGURE 1 the vane 61 is shown in its pulse indicating position wherein it is pivoted against the pin 64. In FIGURE 3 the vane 61 is shown in cross section and in full line, in its normal or reset position and in dotted lines in its pulse indicating position. In the full line position, the vane 61 is directly beneath the probe 62 and will prevent downward movement of the probe, whereas in the dotted line position, the probe 62 is free to move downwardly past the vane 61 through a slot 65 (see FIGURES 1 and 3).

The probe 62 is carried by a lever 66 that is pivoted to a supporting bracket 67 and is spring biased in a clockwise direction by a tension spring 68. The shielded cable wire or other mechanical output device 12 having a casing 69 is supportedly connected to the bracket 67 and operatively connected to the lever 66 so as to transmit motion of the lever 66 to a remote location.

Turning to the left hand portion of FIGURE 1, it will be seen that the shielded cable wires 12 from each fluid jet device 21 come into a frame 71 and pass through comb bail 72 in parallel fashion. The shielded cable wires 12 are each operatively connected to the comb bail 72 by a blocking member or bead 73 by which simultaneous movement of the shilded cable wires and their associated probes 62 is effected.

The comb bail 72 is pivoted about an axis 74 and is biased by a spring 75 in a clockwise direction so as to tend to permit the beads 73 and shielded cable wires 12 to move to the right under the influence of the springs 68. A face cam 76 is mounted on the shaft 43 and includes a high dwell portion 76a, a low dwell portion 76b and a reset portion 76c. The comb bail 72 has a cam follower 77 that is held in constant contact with the face cam 76a by the spring 75. During most of the rotation, the cam follower 77 rides on the high dwell portion 76a of the face cam 76 and holds the comb bail 72 in a leftward position resisting the force of springs 68 and maintaining the probes 62 in their raised position. At the point in the cycle between the time that commutator 32 has passed the last fluid latch 21 and before the reset valve 52 has reset the fluid latches, the cam follower 77 moves to the low dwell portion 76b of the face cam 76 and permits the shielded cable wires 12 to move to the right under the influence of their associated springs 68. The vanes 61 in those fluid latches 21 which received a pulse from the commutator 32 will be in the position shown in dotted line in FIGURE 3 and the probe 62 and shielded cable 12 associated therewith, when released by the comb bail 46, will move past the vane 61 and produce an output in the form of a movement of the shielded cable. The vanes 61 in those fluid latches 21 which received no pulse from the commutator 32 will be positioned in the full line position shown in FIGURE 3, and the probe 62 and shielded cable 12 associated therewith will be prevented from moving when released by the comb bail 72. The resultant output signal thus appears as a combination of pulls or no pulls on the parallel group of shielded cables 12. As mentioned above, these parallel shielded cables can be employed for controlling any permutably controlled device such as a paper tape punch 13.

Continuing to the end of the cycle, the cam follower 77 is moved leftwardly by the reset portion 76c of the face cam 76 and restored to the high dwell position thus restoring also each of the shielded cables 12 by means of the beads 73.

It will thus be appreciated that this invention provides a general purpose deserializer that is cabable of rapidly and accurately converting a serial group of signals into a parallel signal for usage wherever desired. It will also be appreciated that the deserializer of this invention, due to its structural nature, is relatively insensitive to minor variations in sequence timing, temperature changes and rough handling. Furthermore the novel pneumatic-mechanical transducer of this invention can be employed in uses more general than deserialization.

While there is shown a specific exemplary and preferred embodiment of this invention for purposes of illustration, those skilled in the art will recognize that various structural modifications can be made without departing from the novel concepts herein disclosed as set forth and particularly defined in the appended claims.

We claim:

1. An information bit deserializer comprising:
    a rotor having an axis;
    a radially outwardly extending fluid conduit carried by said rotor;
    means for selectively connecting said conduit with a source of fluid under pressure;
    selectively operable means for rotating said rotor about its axis during a substantially contant time period;
    a plurality of bistable pure fluid latches operatively connected to a source of fluid under pressure, each of said fluid latches having input passage means spaced angularly about said axis for serial fluid communication with said conduit during rotation of said rotor in said time period;
    plural output means individually associated with individual ones of said latches and normally non-sensitive to the status thereof; and
    means operative subsequent to said time period for simultaneously rendering all of said output means sensitive to the status of their associated latches.

2. An information bit deserializer comprising:
    a rotor having an axis;
    a fluid conduit carried by said rotor and having an outlet portion displaced from said axis;
    means for selectively connecting said conduit with a source of fluid potential;

selectively operable means for rotating said rotor about its axis during a substantially constant time period;

a plurality of bistable, fluid pressure differential operatable latches controllingly-operatively connected to a source of fluid under pressure, each of said latches having input passage means spaced angularly about said axis for serial fluid communication with said outlet portion during rotation of said rotor in said time period;

plural output means individually associated with individual ones of said latches and normally non-sensitive to the status thereof; and means operative subsequent to said time period for simultaneously rendering all of said output means sensitive to the status of their associated latches.

3. An information bit deserializer comprising:
a rotor having an axis;
a fluid conduit carried by said rotor and having an outlet portion displaced from said axis;
means for selectively connecting said conduit with a source of fluid under pressure;
selectively operable means for rotating said rotor about its axis during a substantially constant time period;
a plurality of bistable pure fluid latches operatively connected to a source of fluid under pressure, each of said fluid latches having input passage means spaced angularly about said axis for serial fluid communication with said outlet portion during rotation of said rotor in said time period;
plural output means individually associated with individual ones of said latches and normally non-sensitive to the status thereof; and
means operative subsequent to said time period for simultaneously rendering all of said output means sensitive to the status of their associated latches.

4. An information bit deserializer comprising:
a rotor having an axis;
driving means including a continuously rotating member;
clutch means activatable for connecting said rotor to said rotating member for increments of substantially no greater than 360 degrees;
a fluid conduit carried by said rotor and having an outlet portion displaced from said axis movable in an arcuate path about said axis;
a plurality of bistable fluid actuatable latches controllingly connected to a source of fluid under pressure, each of said latches having input control passage means spaced along the path of said outlet for serial cooperation therewith during a first portion of its rotation;
serial signal input means for receiving sequential groups of serial information bits, each group comprising a start bit and a fixed plurality of code bits each having one of two distinctive value levels, said signal receiving means being operatively connected to said clutch and said conduit for activating said clutch upon receipt of said start bit and selectively applying fluid flow potential to said conduit in accordance with said plurality of code bits; and
plural output means individually associated with individual ones of said latches and normally non-sensitive to the status thereof; and
means operative subsequent to said first portion of rotation for simultaneously rendering all of said output means sensitive to the status of their associated latches.

5. An information bit deserializer comprising:
a rotor having an axis;
driving means including a continuously rotating member;
clutch means activatable for connecting said rotor to said rotating member for increments of substantially no greater than 360 degrees;

information transmittal means carried by said rotor for movement in an arcuate path about said axis;

a plurality of bistable pure fluid latches operatively connected to a source of fluid under pressure, each of said fluid latches having input control passage means spaced along the path of said information transmittal means for serial cooperation therewith during a first portion of its rotation;

serial signal input means for receiving sequential groups of serial information bits, each group comprising a start bit and a fixed plurality of code bits each having one of two distinctive value levels, said signal receiving means being operatively connected to said clutch and said information transmittal means for activating said clutch upon receipt of said start bit and operating said information transmittal means to selectively create a pressure differential across a fluid latch cooperating therewith in accordance with said plurality of code bits; and plural output means individually associated with individual ones of said latches and normally non-sensitive to the status thereof; and means operative subsequent to said first portion of rotation for simultaneously rendering all of said output means sensitive to the status of their associated latches.

6. An information bit deserializer as defined in claim 5 wherein said information transmittal means comprises:
a fluid conduit having one end thereof on said path; and
said signal receiving means comprises a valve positioned in flow controlling relationship with respect to said conduit to selectively permit or prevent flow therethrough in accordance with each of said plurality of code bits.

7. An information bit deserializer as defined in claim 6 wherein said valve means is an axially movable spool valve.

8. An information bit deserializer as defined in claim 5 wherein the connection between said signal receiving means and said clutch means comprises a push rod connected mechanically between said clutch means and said valve means.

9. An information bit deserializer as defined in claim 5 further comprising means for simultaneously resetting all of said fluid latches to a common status.

10. In a pure fluid amplifier comprising means defining a fluid flow path having a restricted portion, walls defining a diverging channel in serial communication therewith, and signal input means positioned adjacent the upstream end portion of said diverging channel; a pneumatic-mechanical transducer comprising:
a mechanical vane pivotally mounted in operative relationship with the flow in the diverging channel for assuming either of at least two distinct positions indicative of different directional operational states of the pure fluid amplifier;
a probe aligned with said vane when said vane is in one of its distinct positions and selectively movable toward said vane;
means for moving said probe to a detecting position; and
means responsive to the engagement or non-engagement of said probe with said vane for producing an output correspondingly indicative thereof.

11. In a pure fluid amplifier having means defining an inlet portion, a diverging outlet portion in fluid receiving communication with said inlet portion, and signal input means operatively associated with said diverging portion for controlling the direction of fluid flow therethrough, an improved pneumatic-mechanical transducer comprising:
a vane positioned in fluid communication with flow through the diverging portion and supported for pivotal movement about an axis, said vane being oriented about its axis in response to fluid flow direction in the diverging portion so as to assume either of at least two distinct positions indicative of the existence of flow in a corresponding distinct direction in said diverging portion;

detecting means comprising a selectively movable probe for force-engaging said vane when said vane is in one of its two distinct positions, in a direction that has substantially no tangential component with respect to said pivotal axis; and means indicatively responsive to the engagement or non-engagement of said probe with said vane for producing a corresponding output.

12. In a pure fluid amplifier having means defining an inlet portion, a diverging outlet portion in fluid receiving communication with said inlet portion, and signal input means operatively associated with said diverging portion for controlling the direction of fluid flow therethrough, an improved pneumatic-mechanical transducer comprising:

a vane positioned in fluid communication with flow through the diverging portion and supported for pivotal movement about a central axis, means limiting pivotal movement of said vane, said vane being orientable about its axis in response to fluid flow direction in the diverging portion to assume either of at least two distinct positions indicative of the existence of flow in a corresponding distinct direction in said diverging portion;

detecting means comprising a selectively movable probe for force-engaging said vane when said vane is in one of its two distinct positions; and means indicatively responsive to the engagement or non-engagement of said probe with said vane for producing a corresponding output.

13. In an information bit deserializer having a rotor, driving means including a continuously rotating member, clutch means activatable for connecting the rotor to the rotating member for increments of substantially no greater than 360°, a fluid conduit carried by the rotor having an outlet portion movable in an arcuate path upon rotation of the rotor, a plurality of bistable fluid actuatable latches controllingly connected to a source of fluid under pressure, each of the latches having input control passage means spaced along the path of the outlet for serial cooperation therewith during rotation thereof, and plural means operating simultaneously to detect the instantaneous status of each of said latches; in combination with serial signal input means for receiving sequential groups of serial information bits, each group comprising a start bit and a fixed plurality of code bits each having one of two distinctive value levels, the signal receiving means being operatively connected to the clutch and the conduit for activating the clutch upon receipt of the start bit; the improved information transmittal means between the serial signal input means and the fluid conduit comprising a spool valve axially movable within a valve sleeve, said valve sleeve having a first flow portion in communication with a source of fluid flow potential and a second, segment shaped slot-like flow portion in communication with the fluid conduit, said spool valve being axially movable within said valve sleeve to selectively permit or prevent flow between said first and second flow portions of said valve sleeve in accordance with each of said plurality of code bits.

14. An information bit deserializer comprising:
a rotor having an axis;
driving means including a continuously rotating member;
clutch means activatable for connecting said rotor to said rotating member for increments of substantially no greater than 360°;
information transmittal means carried by said rotor for movement in an arcuate path about said axis;

a plurality of bistable pure fluid latches operatively connected to a source of fluid under pressure, each of said fluid latches having input control passage means spaced along the path of said information transmittal means for serial cooperation therewith during rotation thereof;

serial signal input means for receiving sequential groups of serial information bits, each group comprising a start bit and a fixed plurality of code bits each having one of two distinctive value levels, said signal receiving means being operatively connected to said clutch and said information transmittal means for activating said clutch upon receipt of said start bit and operating said information transmittal means to selectively create a pressure differential across a fluid latch cooperating therewith in accordance with said plurality of code bits;

said status detecting means comprising:

a plurality of vanes, each pivotally mounted in operative relationship with the flow in an associated bistable fluid latch for assuming one of two distinct positions indicative of the status of its associated fluid latch;

a plurality of probes, one probe positioned adjacent each of said fluid latches and aligned with an associated vane when said vane is in one of its two distinct positions; and means for simultaneously moving said probes to vane detecting positions to detect the presence or absence of respective vanes in said one of said two distinct positions.

15. An information bit deserializer comprising:
a rotor having an axis;
a fluid conduit carried by said rotor and having an outlet portion displaced from said axis;
means for selectively connecting said conduit with a source of fluid potential;
means for rotating said rotor about its axis;
a plurality of bistable, fluid pressure differential operatable latches controllingly-operatively connected to a source of fluid under pressure, each of said latches having input passage means spaced angularly about said axis for serial fluid communication with said outlet portion during rotation of said rotor;
means for simultaneously detecting the instantaneous status of each of said latches, said status detecting means comprising:

a plurality of vanes, each pivotally mounted in operative relationship with the flow in an associated bistable fluid latch for assuming one of two distinct positions indicative of the status of its associated fluid latch;

a plurality of probes, one probe positioned adjacent each of said fluid latches and aligned with an associated vane when said vane is in one of its two distinct positions; and means for simultaneously moving said probes to vane detecting positions to detect the presence or absence of respective vanes in said one of said two distinct positions.

16. An information bit deserializer comprising:
a plurality of bistable fluid latches operatively connected to a source of fluid under pressure, each of said fluid latches having control means capable of changing the flow status therein, said control means being effectively positioned along an arcuate path;
a rotor having an axis positioned centrally of said path,
selectively operable means for rotating said rotor about its axis during a substantially constant time period;
information transmittal means carried by said rotor and displaced from said axis to traverse said path, said information transmittal means being selectively operative, when positioned cooperatively with respect to the control means of each fluid latch, to activate said control means and thereby change the fluid status of the fluid latch; and plural output means individually associated with individual ones of said latches and normally nonsensitive to the status thereof; and means operative subsequent to said time period for simultaneously rendering all of said output means sensitive to the status of their associated latches.

References Cited by the Examiner

UNITED STATES PATENTS

| | | | |
|---|---|---|---|
| 757,066 | 4/1904 | Soblik | 197—15 |
| 2,218,113 | 10/1940 | Kleinschmidt | 197—15 |
| 3,056,974 | 10/1962 | Cohen | 200—46 |
| 3,124,160 | 3/1964 | Zilberfarb | 137—610 |
| 3,171,915 | 3/1965 | Johnson | 200—81 |
| 3,202,180 | 8/1965 | Gray | 137—625.15 |

FOREIGN PATENTS

| | | |
|---|---|---|
| 701,382 | 1/1921 | France. |
| 856,209 | 12/1960 | Great Britain. |

OTHER REFERENCES

Aizerman: "New Developments in Pneumatic Hydraulic Automation," October 22, 1962, pages 29 and 30.

Saghafi et al.: "Data Transmission System," IBM Technical Disclosure Bulletin, volume 6, No. 5, October 1963, pages 48–50.

RICHARD B. WILKINSON, *Primary Examiner.*

LOUIS J. CAPOZI, *Examiner.*

W. F. BAUER, *Assistant Examiner.*